United States Patent
Torres Martinez (10) Patent No.: US 12,496,785 B2
(45) Date of Patent: Dec. 16, 2025

(54) COMPOSITE TAPE APPLICATOR HEAD

(71) Applicant: M. TORRES DISENOS INDUSTRIALES, S.A.U., Torres de Elorz (ES)

(72) Inventor: Manuel Torres Martinez, Torres de Elorz (ES)

( * ) Notice: Subject to any disclaimer, the term of this patent is extended or adjusted under 35 U.S.C. 154(b) by 165 days.

(21) Appl. No.: 17/996,159

(22) PCT Filed: Apr. 14, 2021

(86) PCT No.: PCT/ES2021/070241
§ 371 (c)(1),
(2) Date: Oct. 13, 2022

(87) PCT Pub. No.: WO2021/209663
PCT Pub. Date: Oct. 21, 2021

(65) Prior Publication Data
US 2023/0234303 A1    Jul. 27, 2023

(30) Foreign Application Priority Data
Apr. 15, 2020   (ES) .................... P202030303

(51) Int. Cl.
| B29C 70/38 | (2006.01) |
| B29C 70/34 | (2006.01) |
| B29C 70/54 | (2006.01) |

(52) U.S. Cl.
CPC ............ *B29C 70/388* (2013.01); *B29C 70/34* (2013.01); *B29C 70/545* (2013.01)

(58) Field of Classification Search
CPC ..... B29C 70/388; B29C 70/34; B29C 70/545; B29C 43/46
See application file for complete search history.

(56) References Cited

U.S. PATENT DOCUMENTS

| 4,591,402 A | 5/1986 | Evan et al. |
| 2009/0090804 A1 | 4/2009 | Torres Martinez |

FOREIGN PATENT DOCUMENTS

| DE | 60009421 T1 * | 3/2005 | ............ B65H 16/04 |
| ES | 2114413 A1 | 5/1998 | |
| ES | 2186458 A1 | 5/2003 | |

OTHER PUBLICATIONS

Translation DE60009421T2 Torres Martinez (Year: 2005).*

(Continued)

*Primary Examiner* — JaMel M Nelson
*Assistant Examiner* — Erica Hartsell Funk
(74) *Attorney, Agent, or Firm* — LUCAS & MERCANTI, LLP (57) ABSTRACT

An applicator head (1) for the application of a composite tape (2) fed from a supply reel (3) to a surface for the deposition thereof; the tape (2) formed by a layer of composite material (2.1) disposed on a supporting layer (2.2). The applicator head (1) has a cutting device (30), compaction device (40) and/or collection device (50). The cutting device (30) is displaced in a first direction of displacement of a first blade (31) at an angle with regard to a second direction of displacement of a second blade (32). The compaction device (40) has an application separator (41) separating the layer of composite material (2.1) from the supporting layer (2.2) at a certain height from the surface for the deposition thereof. And the collection device (50) has a collection separator (52) separating the unused layer of composite material (2.1) and collecting in a collection container (53).

21 Claims, 6 Drawing Sheets

(56) References Cited

OTHER PUBLICATIONS

International Search Report for Corresponding International Application No. PCT/ES2021/070241 dated Jun. 11, 2021 and English Translation, 5 pages.
ES Search Report for corresponding Application No. ES 202030303 dated Jun. 15, 2020.

* cited by examiner

COMPOSITE TAPE APPLICATOR HEAD

CROSS REFERENCE TO RELATED APPLICATION

This Application is a 371 of PCT/ES2021/070241, filed on Apr. 14, 2021 which claims the benefit of Spanish Patent Application No. P202030303, filed on Apr. 15, 2020, each of which are incorporated herein by reference.

TECHNICAL FIELD

The present invention relates to the industry dedicated to the application of composite tapes whereby laminated pieces that are used in the aeronautical, naval, etc. industries are formed, and more specifically with the tape applicator head that applies said composite tapes.

STATE OF THE ART

At present, heads for applying composite tapes used for the application by means of compact superposition of layers of composite material to form laminated parts that are mainly used in the aerospace industry are known. The demand for lighter and more energy efficient aircraft has resulted in the gradual and direct substitution of metallic components with composite materials, which also allow the development of integral designs.

Therefore, it is necessary to have heads for applying composite tapes that reduce production times while at the same time maintaining the quality of the final product. Heads of this type comprise compacting means acting on the composite tape to be applied, pressing on same to fix it on the surface for the deposition thereof, to establish compaction, and preventing the formation of bubbles that render the part that contains them unusable.

Spanish Patent ES 2186458 B1, belonging to the same applicant of the present invention, refers to heads of this type. This head comprises cutting means to establish the beginning of the tape to be applied on the surface for the deposition thereof and to cut the end of the applied tape while the head advances. However, when straight cuts are to be made, the head must stop to make the cut of the composite tape or otherwise there will be surpluses at the limits of the surface for deposition. Deposition times of composite tapes are thereby increased with the corresponding increase in production costs, or alternatively an additional cutting process is necessary to remove the surpluses together with the consequent additional cost of material and also of time in post-processing.

Another drawback of this solution is that it is necessary for the head to leave the area to be taped in order to discard the waste fibre parts that should not remain in the piece. This is unproductive time in which the fibre is not deposited, increasing production times.

For the application process, this head furthermore comprises compaction means consisting of a hold-down element and a pressure element, which act independently in a successive manner on the surface for deposition. Both elements can be tilted between their respective working and retraction positions so that the hold-down element first acts by applying the tape on the surface for the deposition thereof by pressing on it, and subsequently a pressure element acts by forcefully compressing the applied tape.

The drawback of this compaction mechanism is that the hold-down element holds down the composite fibre together with the fibre support paper against the surface for deposition and therefore cuts the tension of the paper, as a result of the winding of the paper and guiding of the paper, when the fibre loses tension, hinders the application of the composite tape and the collection of the paper, and this may also lead to a deposition of defective fibre in a process stoppage due to maintenance needs of the tape applicator head.

In view of the described drawbacks or limitations that currently existing solutions present, there is a need for a solution that allows composite tapes to be applied in such a way that a fast and reliable application occurs without machine stops or additional cutting processes, improving head dynamics.

OBJECT OF THE INVENTION

In order to meet this objective and solve the technical problems discussed so far, in addition to providing additional advantages that can be derived later, the present invention provides an applicator head for the application of a composite tape preferably fed from a supply reel to a surface for the deposition thereof. In a preferred solution of the invention, the tape is formed by a layer of composite material disposed on a supporting layer. The applicator head comprising cutting means for cutting the fed layer of composite material to be applied to the surface for the deposition thereof, the layer of composite material being cut while it is applied on the surface for the deposition thereof.

The cutting means for cutting the applicator head for the application of a composite tape comprises a first blade longitudinally displaceable in a first direction of displacement being configured to cut the layer of composite material, and a second blade to cut the layer of composite material displaceable in a second direction of displacement, such that the first direction of displacement of the first blade is at an angle with regard to the second direction of displacement of the second blade.

As a result of this configuration, when the layer of composite material is to be cut for its application, in the case in which the surface for deposition requires a straight cut of the layer of composite material, it is not necessary to stop the applicator head since with one of the two blades, as a result of its direction of displacement, it allows cutting while the application head advances. This configuration not only allows straight cuts (perpendicular to the direction of movement of the fibre) but also allows a high degree of different configurations in cutting the tape with the head in motion, which can be efficient and have a higher process speed even in complex geometries on the surface for deposition. The productivity of the machine that performs a continuous application of the layer of composite material without stopping the head is thereby improved, allowing it to be cut in motion regardless of the direction of the cut.

Preferably, one of the directions of displacement of the blades is perpendicular to the feed direction of the composite tape, so that cuts of the layer of composite material can be made at an angle with same, and with the other blade at an angle with regard to the previous one, straight cuts can be made without stopping the tape application process. Thus, the cutting means comprises guiding means on which a blade-holding mechanism comprising the cutting blade is displaced longitudinally, in the direction of displacement. Said guiding means may be in the form of, for example, a spindle, a linear actuator, a rack-and-pinion mechanism, etc.

The invention also relates to an applicator head comprising compaction means for compacting the fed layer of composite material to be applied on the surface for the deposition thereof.

According to the invention, the head comprises compaction means comprising a compaction roller configured to apply pressure on the layer of composite material applied to the surface for the deposition thereof. Said compaction means further comprise an application separator configured to separate a layer of composite material from the supporting layer by a cut edge of the layer of composite material by applying separation pressure on the tape on the side of the supporting layer, so that the cut edge of the separated layer of composite material points towards a contact area between the compaction roller and the surface for deposition at a certain height of the application separator from the surface for deposition.

As a result of this configuration, the layer of composite material to be applied is separated and undercutting takes place without holding the supporting layer against the surface for deposition. In this way, the tension of the supporting layer is not lost as occurs in some embodiments of the state of the art. The compaction means improves the dynamics of the applicator head, simplifying the handling of the supporting layer and preventing the possible creation of air bubbles when applying the layer of composite material on the surface for the deposition thereof due to the loss of tension of the supporting layer. The application of pressure for the compaction of the layer of composite material on the surface for the deposition thereof is directly exerted by the compaction roller, which receives the cut edge of the layer of composite material in the contact area of said roller with the surface for the deposition thereof, thus improving compaction and preventing the creation of bubbles.

Preferably, the application separator is configured to separate the layer of composite material such that the separated layer of composite material contacts the compaction roller before said layer of composite material contacts the surface for the deposition thereof. The compaction roller thereby begins to receive the layer of composite material before the application so that the application is more fluid and the formation of wrinkles and bubbles is prevented.

Another feature of the invention is that the application separator is displaceable to apply separation pressure, so that it is possible to advance material by choosing which part of the composite strip to undercut.

Preferably, the application separator is pivotable so that it goes towards the contact area to apply separation pressure. Thus, the separation of the layer of composite material is performed as close as possible to the contact area between the compaction roller and the surface for the deposition thereof, ensuring the correct compaction of the layer of composite material on the surface for the deposition thereof.

To contribute to this approximation of the application separator to the contact area between the compaction roller and the surface for deposition, it is planned that the application separator is preferably intended to have its end in the form of a wedge, and the separation of the layer of composite material from the supporting layer is also more effective.

The invention also relates to an applicator head comprising collection means for collecting the fed layer of composite material not used on the surface for the deposition thereof.

According to another aspect, the invention provides an applicator head with collection means for collecting the fed layer of composite material not used on the surface for the deposition thereof. Said collection means comprises a collection separator configured to separate the unused cut layer of composite material from the supporting layer by a cut edge of the layer of composite material. This is achieved by applying a separation pressure on the tape on the side of the supporting layer. The collection means also comprises a collection container which collects the separated part of the layer of composite material.

As a result of this configuration, surpluses of the fed layer of composite material generated during cutting and that should not be applied on the surface for deposition are separated. This prevents, in the stockpiling reel-holder where the supporting layer is wound, said surplus from being stored and the reel from being able to be used with the supporting layer for reuse or recycling. An additional process is thus eliminated by preventing the machine comprising the applicator head from coming out of the mould. Consequently, production times are reduced, saving on costs and material.

Preferably, the separator of the collection means is displaceable to apply separation pressure on the tape at the precise moment, selecting the separation only of the surplus of the unused layer of composite material.

For better dynamics and separation of the surpluses of the unused layer of composite material, the collection means are preferably intended to comprise at least two positioning rollers on which the tape circulates to the stockpiling reel-holder, with the actuator being interposed between both positioning rollers. The application of the separation pressure of the tape is thereby favoured, directing the surplus towards the collection container.

Additionally, the collection separator preferably comprises a protrusion to apply separation pressure on the tape, so as to facilitate the separation of the unused layer of composite material.

The invention also contemplates an applicator head comprising cutting means and/or compaction means and/or collection means.

DETAILED DESCRIPTION OF THE INVENTION

In light of the aforementioned figures, and in accordance with the adopted numbering, one may observe therein a preferred exemplary embodiment of the invention, which comprises the parts and elements indicated and described in detail below.

Figure 1:
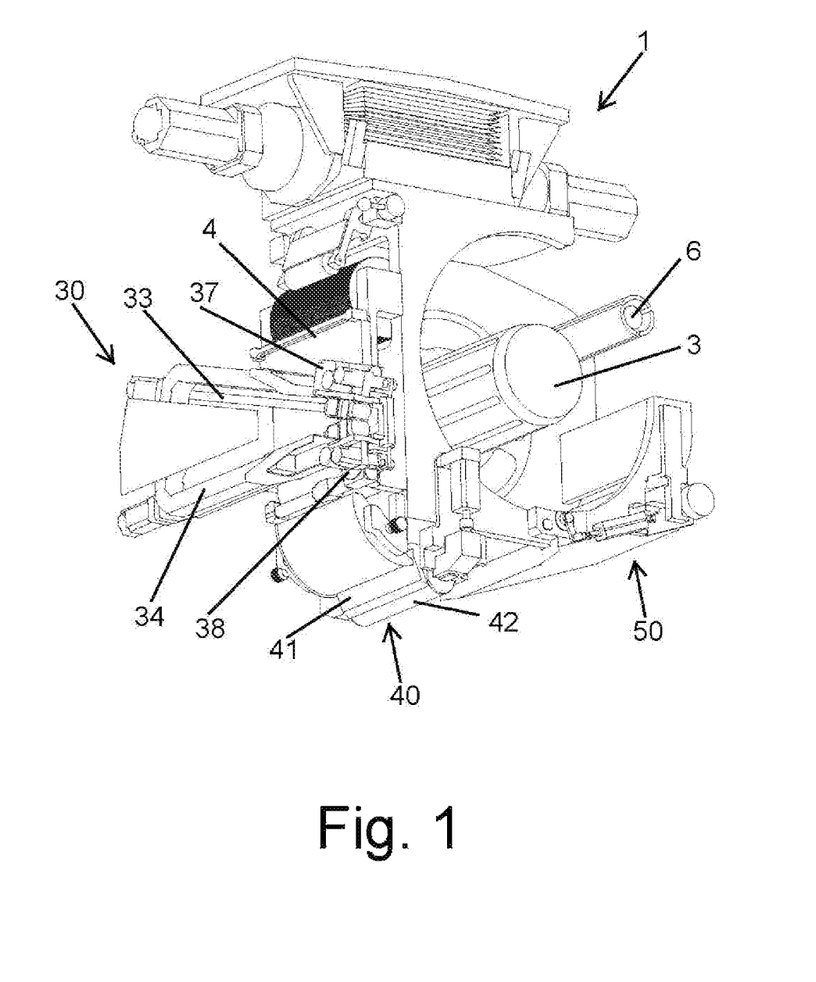
FIG. 1 shows a schematic perspective view of an applicator head for applying composite tapes (1) with cutting means (30), compaction means (40) and collection means (50).

FIG. 1 shows an applicator head (1) for the application of tapes (2) of the type used for the application by means of the compact superposition of layers of composite material (2.2) to form laminated parts that are mainly used in the aerospace industry. The applicator head (1) of a preferred embodiment shown in FIG. 1 comprises cutting means (30), compaction means (40) and collection means (50).

A mould is provided in which there is defined a surface for deposition on which the layers of composite material (2.2) will be applied. In a first step, a supply reel with a tape (2) made up of a layer of composite material (2.1) on a supporting layer (2.2) is disposed on a supply reel-holder (3), with the layer of composite material (2.1) having a greater rigidity than the supporting layer (2.2).

Next, the tape (2) is circulated through a guide (4). At the moment that the tape (2) reaches cutting means (30), knowing the shape of the surface for deposition where the layer of composite material (2.1) is going to be deposited, a cut is made to the tape (2). Said cut is made with a blade (31, 32) with such precision that it allows the cutting of the layer of composite material (2.1) to be applied without the cutting of the supporting layer (2.2).

Figure 2:
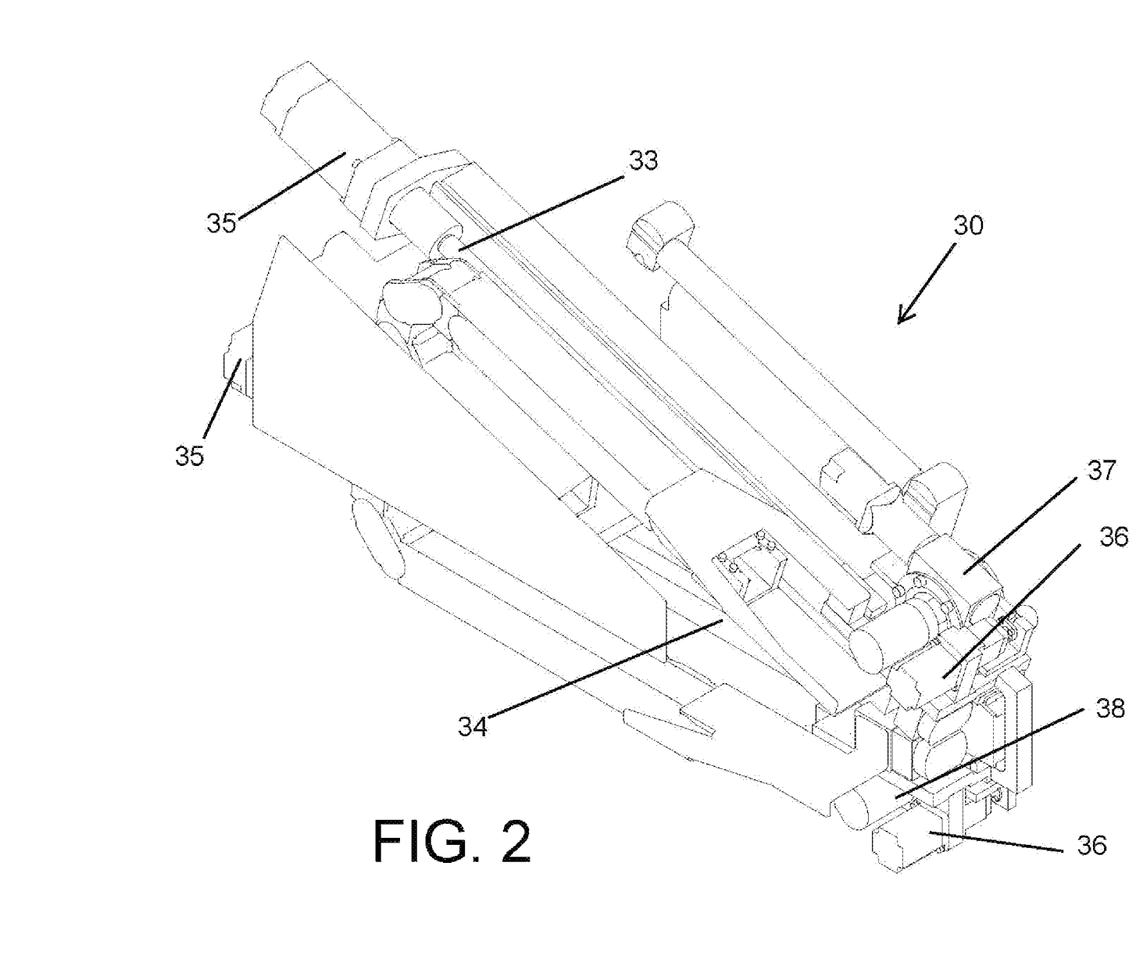
FIG. 2 shows a perspective view of the cutting means (30).
Figure 3:
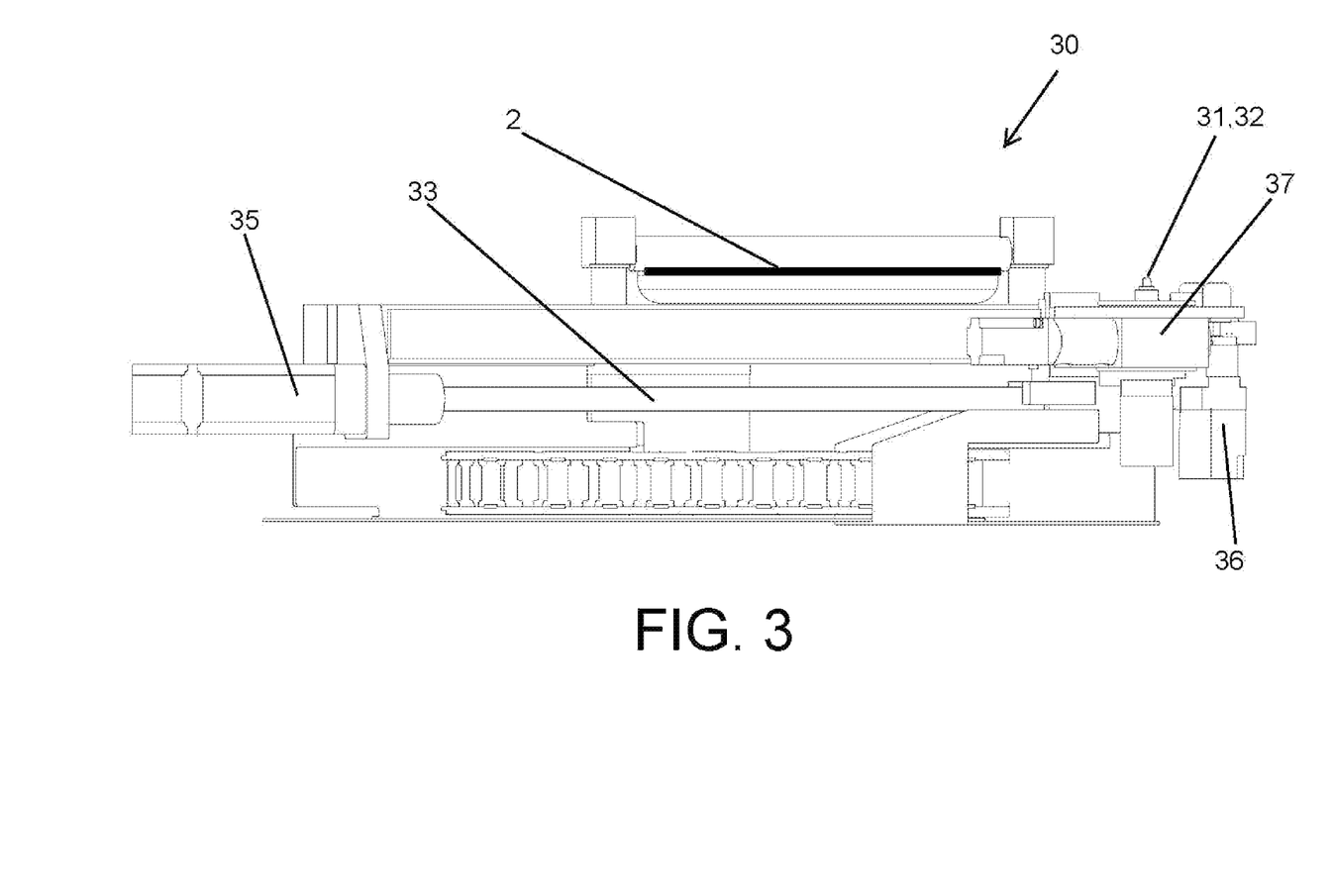
FIG. 3 shows a top view of the cutting means (30) in which only the first blade (31) is seen, however, the second blade (32) is also indicated, since it would be at the same height.
Figure 4:
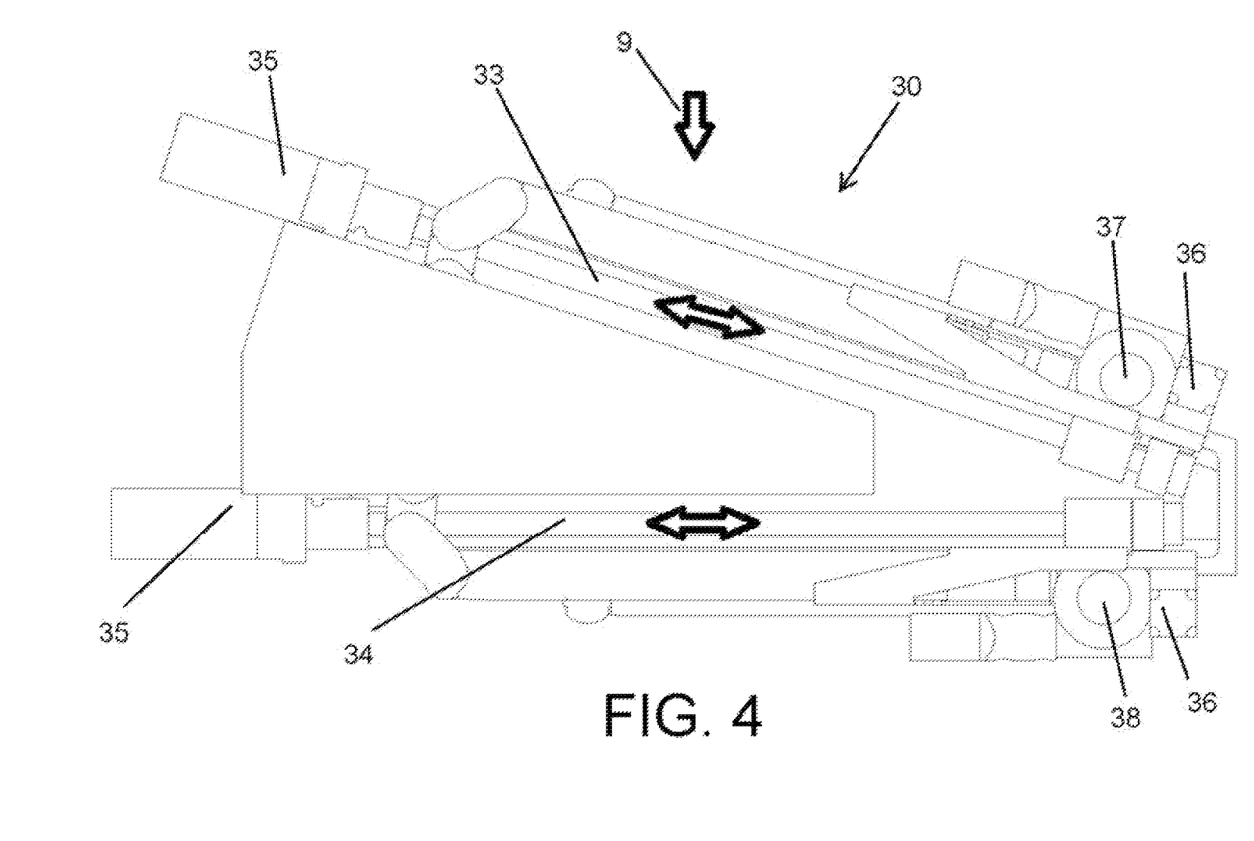
FIG. 4 shows a front view of the cutting means (30), where the direction of displacement of the blades (31, 32) on the spindles (33, 34) and the direction of displacement (9) of the tape (2) are indicated with arrows.

To proceed with said cutting, the cutting means (30) comprises a first blade (31) and a second blade (32). As can be seen in FIG. 3, the first blade (31) is comprised in a first blade holder (37) which, as seen in FIGS. 2 and 4, is displaced longitudinally in a first direction on guiding means, the guiding means in this particular case being a first spindle (33), so that said first spindle (33) is at an angle with regard to the perpendicular to a feed direction of the composite tape (2). In the preferred embodiment illustrated in FIG. 1, the feed direction is vertical, advancing along the guide (4), so that the first spindle (33) is at an angle with regard to the horizontal defining a displacement of the blade (31) at an angle.

As can be seen in FIGS. 2 and 4, said cutting means (30) also comprises the second blade (32) comprised in a second blade holder (38) that is displaced longitudinally in a second direction of displacement on a second spindle (34) so that said second spindle (34) is in a horizontal position defining a horizontal displacement of the second blade (32).

In this way an actuator cylinder (36) transversely displaces the blade holder (37, 38) until the blade (31, 32) contacts the tape (2) and at that moment an actuator (35) causes the displacement of the blade holder (37, 38) along the spindle (33, 34) so that the blade (31, 32) produces a first cut on the tape (2). A blade or another device is used, as needed according to the shape of the mould of the part to be generated and generating for that purpose a cut edge of the layer of composite material (2.1) to be applied.

Next, the cut tape (2) goes to compaction means (40) for the application of the layer of composite material (2.1) on the surface for the deposition thereof.

Figure 5:
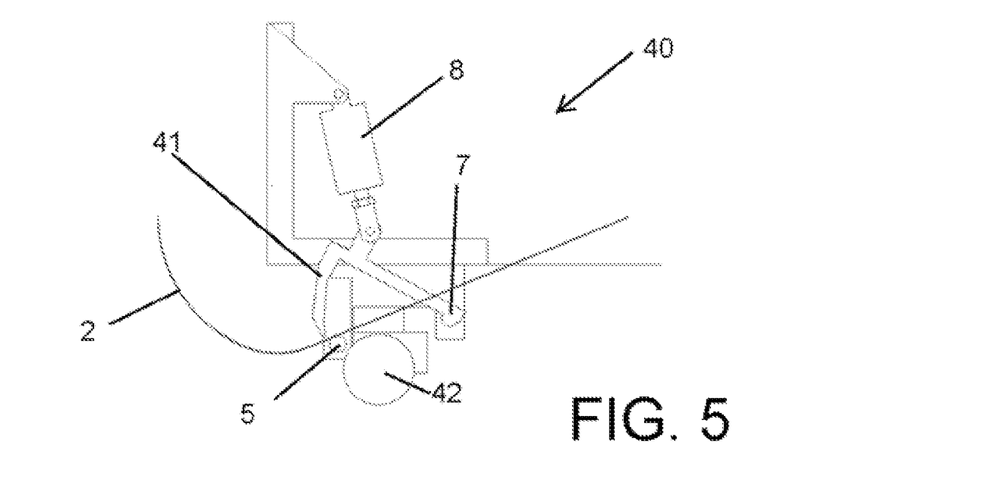
FIG. 5 shows a schematic front view of the compaction means (40) with the application separator (41) in a higher retracted position in which it does not act on the tape (2).
Figure 6:
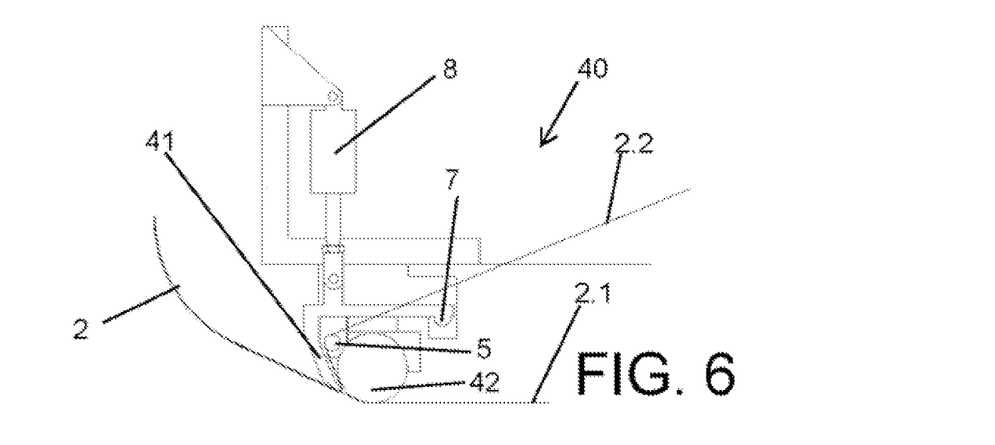
FIG. 6 shows a schematic front view of the compaction means (40) with the application separator (41) in a working position in which it acts against the tape (2).
Figure 7:
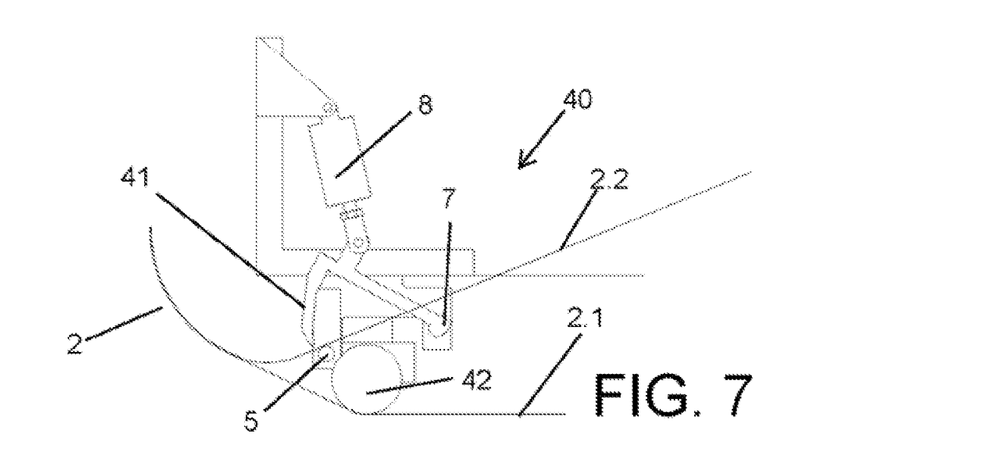
FIG. 7 shows a schematic front view of the compaction means (40) with the application separator (41) in an upper retracted position with the layer of composite material (2.1) being applied on the surface for the deposition thereof and separated from the supporting layer (2.2).

FIGS. 5, 6 and 7 show the sequence carried out by the compaction means (40) for the application of the layer of composite material (2.1) on the surface for the deposition thereof.

At first, an application separator (41) is in the retracted position, advancing the tape (2) with the layer of composite material (2.1) and the supporting layer (2.2) without being applied, as can be seen in FIG. 5. As the applicator head (1) approaches the surface for the deposition thereof, the application separator (41) applies separation pressure on the tape (2). The movement of said application separator (41) is selected so that it separates the layer of composite material (2.1) by the previously generated cut edge. Thus, the application separator (41) pivots with regard to an articulation (7) by the action of a pneumatic actuator (8). Upon being pivotally displaced, it comes as close as possible to a contact area between a compaction roller (42) and the surface for deposition. To favour the separation between the layer of composite material (2.1) to be applied and the supporting layer (2.2), the application separator (41) is wedge-shaped.

As can be seen in FIG. 6, with the compaction roller (42) already in contact with the surface for deposition due to the movement of the applicator head (1), the application spreader (41) applies pressure to the tape (2) in a working position in which the wedge-shaped end of the application separator (41) is located between the compaction roller (42) and the surface for deposition. A separation pressure is then applied on the tape (2) without acting on surface for deposition, that is, at a height of the application separator (41) from the surface for deposition such that the tension of the supporting layer (2.2) in the applicator head (1) is not lost. When acting on the tape (2) and given that the layer of composite material (2.1) has a greater rigidity than the supporting layer (2.2), when the separation pressure is applied, the tensioned tape (2) deforms upon reaching a detachment angle with the help of support on a guide roller (5). The separation of the layer of composite material (2.1) from the paper supporting layer (2.2) is thereby achieved.

With this configuration, the application separator (41) directs the layer of composite material with its cut edge towards the contact area between the compaction roller (42) so that the separated layer of composite material (2.1) contacts the compaction roller (42) before said layer of composite material (2.1) contacts the surface for the deposition thereof. Thus, the compaction roller (42) contacts the contacting layer of composite material (2.1) between the compaction roller (42) and the surface for the deposition thereof, depositing the layer of composite material (2.1) on the surface for the deposition thereof and applying a compaction force. The formation of bubbles that cause the final part to present defects and lose properties or be discarded is thereby prevented.

As can be seen in FIG. 7, the layer of composite material (2.1) has already been separated from the supporting layer (2.2), and the layer of composite material (2.1) is being applied on the surface for the deposition thereof, being compacted by the compaction roller. (42); at this time, the application separator (41) returns to its retracted position.

The application of the layer of composite material (2.1) continues with the advance of the applicator head (1) until reaching the edge where the mould ends, where the layer of composite material (2.1) is applied. For this purpose, moments before reaching the end of the application of the layer of composite material (2.1), the cutting means (30)

cuts the layer of composite material (2.1) so that the direction of the cut coincides with the shape of the mould or surface for deposition.

For this purpose, if it is necessary to make a cut of the tape (2) at an angle, the advance of the head (1) is synchronised with the displacement of the second blade (32) so that the edge of the cut layer of composite material (2.1) coincides with the shape of the edge of the mould without it being necessary to stop the advance of the head (1). However, this is not possible when the cut to be made is horizontal and not at an angle. To do this, if the second blade (32) were to be used, it would be necessary to stop the head (1) and make the cut by displacing the second blade (32), which increases manufacturing times.

In order to solve this problem, the advance movement of the head (1) is synchronised with the displacement of the first blade (31), so that a straight cut is achieved without having to stop the advance of the head (1) when the displacement of the first blade (31) is at an angle. It furthermore allows the cut to be made for the next application, and for the advance of the head (1) not to stop.

Once the layer of composite material (2.1) has been deposited on the surface for the deposition thereof, the tape (2) goes to a stockpiling reel-holder (6). Sometimes surpluses of layer of composite material (2.1) are generated between one cut and the next of the tape (2), and said surplus remains on the tape (2) that goes to the stockpiling reel-holder (6). These surpluses are commonly removed manually once the reel is removed from the stockpiling reel-holder (6), and other times they are deposited on a table outside the application area. This requires an additional process and the consequent increase in manufacturing times.

According to a preferred feature of the invention, the head (1) comprises collection means (50) for collecting the fed layer of composite material (2.1) not used on the surface for the deposition thereof. The sequence of separating surpluses of layer of composite material (2.1) from the supporting layer (2.2) can be seen in FIGS. 8, 9 and 10.

Figure 8:
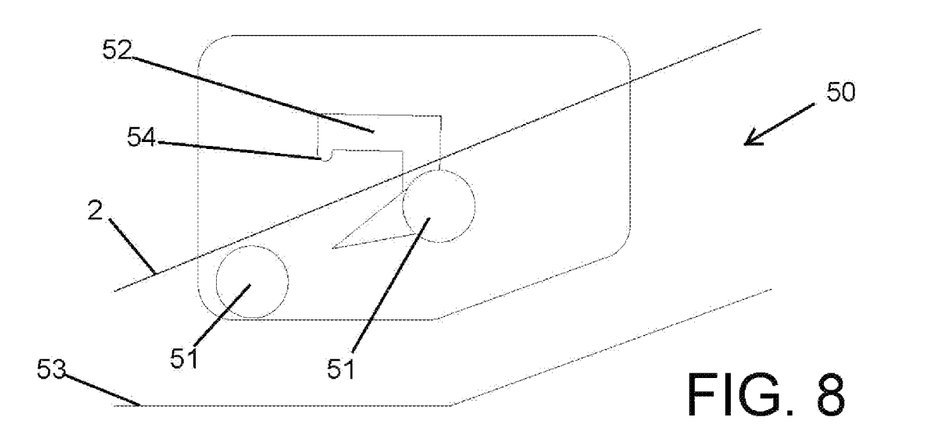
FIG. 8 shows a detailed view of the collection means (50) with the collection separator (52) in the standby position above the tape (2).

At first, a collection separator (52) configured to separate the unused cut layer of composite material (2.1) from the supporting layer (2.2), is placed in an upper standby position above the tape (2), as can be seen in FIG. 8.

Figure 9:
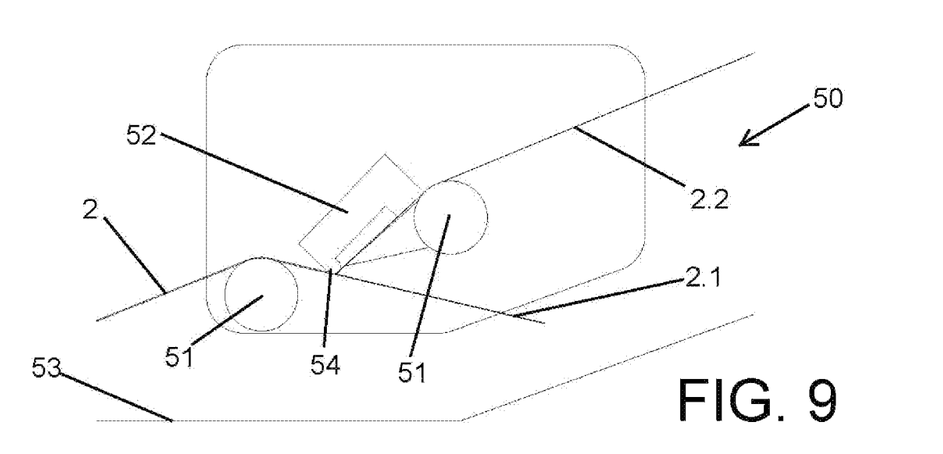
FIG. 9 shows a detailed view of the collection means (50) with the collection separator (52) in an actuation position in which it acts against the tape (2) releasing the unused layer of composite material (2.1) waste.

It can be seen in FIG. 9 how the collection separator (52) acts on a cut edge of the layer of composite material (2.1) by applying a separation pressure on the tape (2) on the side of the supporting layer (2.2) by the action of a pneumatic actuator. Said collection separator (52) is located between two positioning rollers (51) so that the tape (2) forms a certain angle that allows the separation of the layer of composite material (2.1) as it is more rigid than the supporting layer (2.2) that follows its path to the stockpiling reel-holder (6). The collection separator (52) is thereby displaced to the working position in which it applies pressure on the tape (2), preferably with a protrusion (54), achieving the separation of the layer of composite material (2.1).

Figure 10:
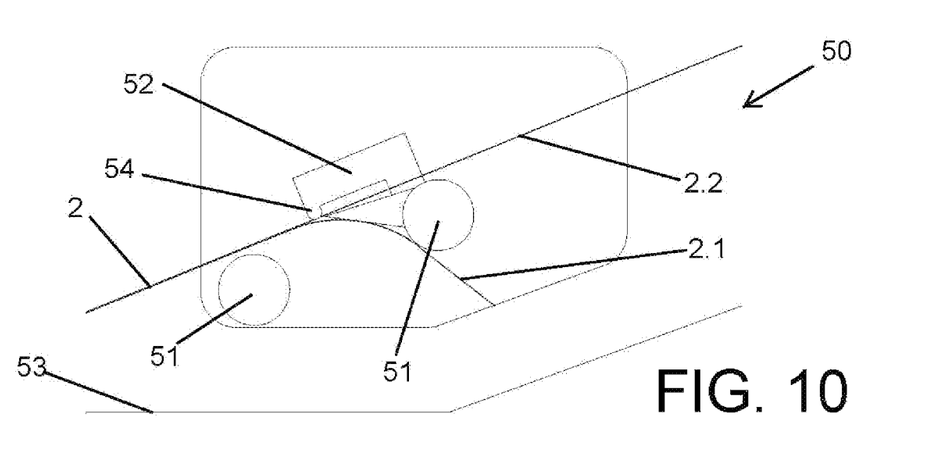
FIG. 10 shows a detailed view of the collection means (50) with the collection separator (52) in the standby position with the supporting layer (2.2) going to a reel-holder and the surplus layer of composite material (2.1) going to the collection container (53).

It can be seen in FIG. 10 how the collection separator (52) has returned to its standby position in which it does not apply pressure on the tape (2) and the layer of composite material (2.1) is separated, going to a collection container (53) to collect the surplus layer of composite material (2.1).

A reel comprising only a supporting layer is thereby collected on the stockpiling reel-holder (6) for later use or recycling.

The deposition of a first layer of composite material (2.1) is thus completed, leaving the head (1) ready for the application of the next layer of composite material (2.1) on the surface for the deposition thereof.

The invention claimed is:

1. An applicator head for the application of a composite tape fed from a supply reel to a surface for the deposition thereof; the tape being formed by a layer of composite material disposed on a supporting layer; comprising cutting means for cutting the fed layer of composite material to be applied on the surface for the deposition thereof; the cutting means comprising a first blade configured to cut the layer of composite material in a first direction of linear displacement, the first blade displaceable longitudinally in the first direction of linear displacement, and a second blade configured to cut the layer of composite material in a second direction of linear displacement, the second blade displaceable linearly in the second direction of linear displacement, wherein the first direction of linear displacement of the first blade is different from and at an angle with regard to the second direction of linear displacement of the second blade.

2. The applicator head according to claim 1, wherein the second direction of linear displacement of the second blade is perpendicular to a feed direction of the composite tape.

3. The applicator head according to claim 1, wherein the cutting means comprise guiding means for the displacement of the first blade longitudinally in the direction of linear displacement.

4. The applicator head according to claim 1, comprising compaction means for the fed layer of composite material to be applied to the surface for the deposition thereof; the compaction means comprising a compaction roller configured to apply compaction pressure on the layer of composite material applied on the surface for the deposition thereof, wherein the compaction means comprises an application separator configured to separate a layer of composite material from the supporting layer by a cut edge of the layer of composite material by applying a separation pressure on the tape on the side of the supporting layer, so that the cut edge of the separated layer of composite material points towards a contact area between the compaction roller and the surface for deposition at a certain height of the application separator from the surface for deposition.

5. The applicator head according to claim 4, wherein the application separator is displaceable to apply the separation pressure.

6. The applicator head according to claim 5, wherein the application separator is pivotable so that it goes towards the contact area to apply the separation pressure.

7. The applicator head according to claim 4, wherein the application separator is wedge-shaped to apply the separation pressure on the tape.

8. The applicator head according to claim 1 comprising collection means for collecting the fed layer of composite material not used on the surface for the deposition thereof; the collection means comprising a collection separator configured to separate the unused cut layer of composite material from the supporting layer by a cut edge of the layer of composite material when applying a separation pressure on the tape on the side of the supporting layer, and comprising a collection container for collecting the separated layer of composite material.

9. The applicator head according to claim 8, wherein the application separator is displaceable to apply the separation pressure on the tape.

10. The applicator head according to claim 8, wherein the collection means comprises at least two positioning rollers on which the tape circulates to a stockpiling reel-holder, the actuator being interposed between both positioning rollers to apply the separation pressure on the tape.

11. The applicator head according to claim 9, wherein the collection separator comprises a protrusion to apply separation pressure on the tape.

12. The applicator head according to claim 4, wherein the second direction of linear displacement of the second blade is perpendicular to a feed direction of the composite tape.

13. The applicator head according to claim 4, wherein the cutting means comprise guiding means for the displacement of the first blade longitudinally in the first direction of linear displacement.

14. The applicator head according to claim 8, wherein one of the first direction of linear displacement of the first blade or the second direction of linear displacement of the second blade is perpendicular to a feed direction of the composite tape.

15. The applicator head according to claim 8, wherein the cutting means comprise guiding means for the displacement of the first blade longitudinally in the first direction of linear displacement.

16. The applicator head according to claim 4, comprising collection means for collecting the fed layer of composite material not used on the surface for the deposition thereof; the collection means comprising a collection separator configured to separate the unused cut layer of composite material from the supporting layer by a cut edge of the layer of composite material when applying a separation pressure on the tape on the side of the supporting layer, and comprising a collection container for collecting the separated layer of composite material.

17. The applicator head according to claim 16, wherein the application separator is displaceable to apply the separation pressure on the tape.

18. The applicator head according to claim 16, wherein the collection means comprises at least two positioning rollers on which the tape circulates to a stockpiling reel-holder, the actuator being interposed between both positioning rollers to apply the separation pressure on the tape.

19. The applicator head according to claim 17, wherein the collection separator comprises a protrusion to apply separation pressure on the tape.

20. The applicator head according to claim 1, wherein each of the first blade and the second blade is configured to perform, independently, a complete cutting of the layer of composite material.

21. The applicator head according to claim 1, wherein each of the first and second blades is configured to cut the layer of composite material without stopping a movement of the tape.

* * * * *